US011802383B2

(12) United States Patent
Shelstad et al.

(10) Patent No.: US 11,802,383 B2
(45) Date of Patent: *Oct. 31, 2023

(54) METHOD AND APPARATUS FOR CONTROLLING A QUALITY OF A PAVING MATERIAL

(71) Applicant: MOBA Mobile Automation AG, Limburg (DE)

(72) Inventors: David Shelstad, Peachtree City, GA (US); Paul Angerhofer, Peachtree City, GA (US); Marcus Watermann, Limburg (DE)

(73) Assignee: MOBA MOBILE AUTOMATION AG, Limburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/346,413

(22) Filed: Jun. 14, 2021

(65) Prior Publication Data

US 2021/0301480 A1    Sep. 30, 2021

Related U.S. Application Data

(62) Division of application No. 16/128,148, filed on Sep. 11, 2018, now Pat. No. 11,066,791.

(30) Foreign Application Priority Data

Sep. 13, 2017 (EP) .................................... 17190899

(51) Int. Cl.
*E01C 23/01* (2006.01)
*E01C 19/48* (2006.01)
*G01N 25/72* (2006.01)

(52) U.S. Cl.
CPC .............. *E01C 23/01* (2013.01); *E01C 19/48* (2013.01); *G01N 25/72* (2013.01)

(58) Field of Classification Search
CPC .......... G01J 5/485; E01C 23/01; E01C 19/48; G01N 25/72
(Continued)

(56) References Cited

U.S. PATENT DOCUMENTS 6,749,364 B1    6/2004 Baker et al.
2009/0142133 A1    6/2009 Glee et al.
(Continued)

FOREIGN PATENT DOCUMENTS

CN    102691251 A    9/2012
CN    105333959 A    2/2016
(Continued)

OTHER PUBLICATIONS

International Search Report dated Jun. 3, 2020, issued in application No. 201811070293.5.
(Continued)

*Primary Examiner* — Mirellys Jagan
(74) *Attorney, Agent, or Firm* — McClure, Qualey & Rodack, LLP

(57) ABSTRACT

A method for controlling a quality of a paving material distributed along a paving area using a paver includes: receiving a thermal profile of a portion of the paving area in which the paving material is distributed, and the thermal profile includes a plurality of temperature values of respective measurement points, and analyzing the thermal profile to detect segregation spots of the paving material within the portion. Analyzing includes determining a first zone of measurement points arranged adjacent to each other and having temperature values within a predetermined range, the first zone being at least partially surrounded by measurement points having temperature values out of the predetermined range, and analyzing an orientation of the first zone with respect to a travel direction of the paver. The last substep of
(Continued)

analyzing is assigning an indication, in particular an error indication, to the portion based on the analyzing of the orientation.

8 Claims, 10 Drawing Sheets

(58) Field of Classification Search
USPC .................................................. 374/4
See application file for complete search history.

(56) References Cited

U.S. PATENT DOCUMENTS

| | | |
|---|---|---|
| 2014/0133906 A1 | 5/2014 | Frelich et al. |
| 2016/0042235 A1 | 2/2016 | Buschmann et al. |
| 2016/0060819 A1 | 3/2016 | Oetken et al. |
| 2016/0061755 A1 | 3/2016 | Delius et al. |
| 2016/0131633 A1 | 5/2016 | Schoenbach et al. |
| 2016/0281304 A1 | 9/2016 | Rutz et al. |
| 2019/0078270 A1 | 3/2019 | Laugwitz |
| 2020/0025970 A1 | 1/2020 | Buschmann et al. |
| 2021/0215543 A1* | 7/2021 | Keyes .................... G06V 20/56 |
| 2021/0395961 A1* | 12/2021 | Harms .................... E01C 19/48 |

FOREIGN PATENT DOCUMENTS

| | | |
|---|---|---|
| CN | 105586821 A | 5/2016 |
| CN | 106223174 A | 12/2016 |
| DE | 102008058481 A1 | 7/2009 |
| EP | 2666908 A1 | 11/2013 |
| EP | 2789741 A1 | 10/2014 |
| EP | 2982951 A1 | 2/2016 |
| EP | 2990531 A1 | 3/2016 |
| EP | 3018254 A1 | 5/2016 |
| WO | 00/70150 A1 | 11/2000 |
| WO | 2016198333 A1 | 12/2016 |
| WO | 2017041994 A1 | 3/2017 |

OTHER PUBLICATIONS

Chinese language office action dated Jun. 3, 2020, issued in application No. 201811070293.5.
English Translation of relevant regulations of Chinese office action (issued in application No. 201811070293.5) dated Jun. 3, 2020.
Extended European Search Report dated Mar. 9, 2018 in European Patent Application No. 17190899.9.

* cited by examiner

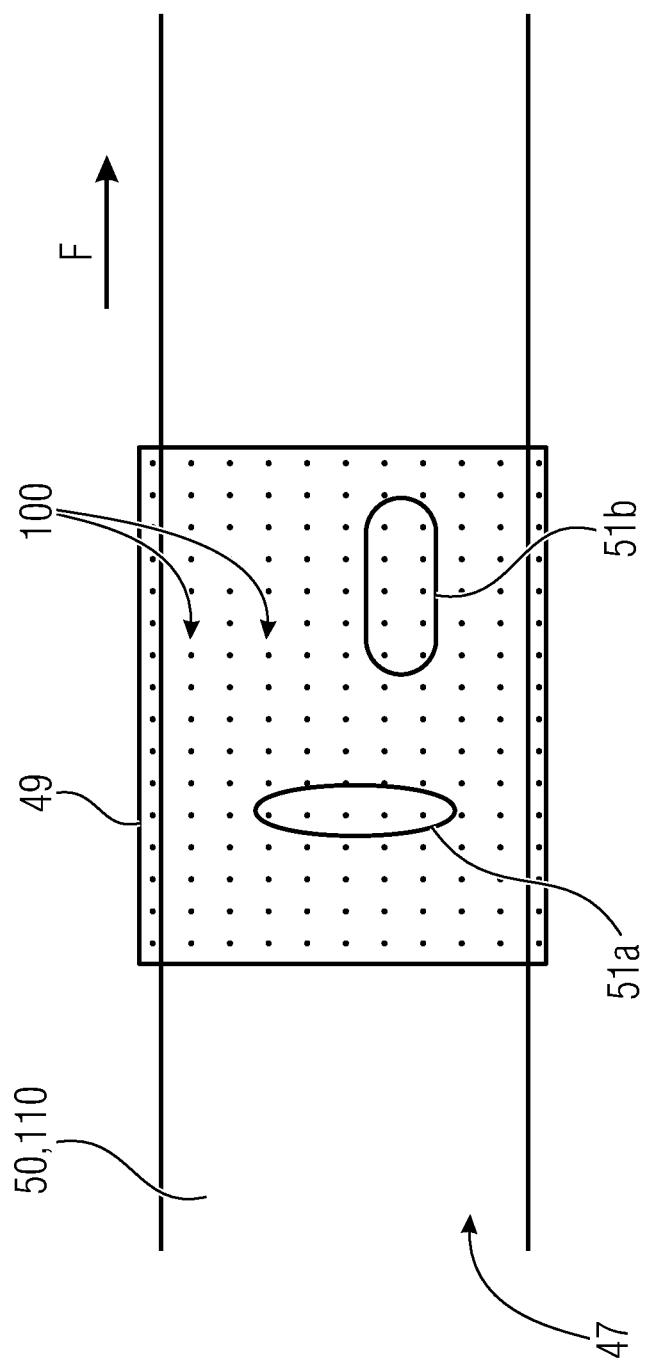

METHOD AND APPARATUS FOR CONTROLLING A QUALITY OF A PAVING MATERIAL

CROSS-REFERENCE TO RELATED APPLICATIONS

This application is a division of copending U.S. patent application Ser. No. 16/128,148, filed Sep. 11, 2019, issued Jul. 20, 2021, as U.S. Pat. No. 11,066,791, which in turn claims priority from European Patent Application No. 17190899.9, which was filed on Sep. 13, 2017, and is incorporated herein in its entirety by reference.

Embodiments of the present invention refer to a method for controlling and an apparatus for detecting a quality of a paving material distributed along a paving area using a paver. Further embodiments refer to the paver comprising the above apparatus. In general, the invention relates to quality control systems in the field of road construction machines, for example asphalt paving machines, based on temperature measurements of the new laid material such as asphalt or bitumen, right behind the machine or the tool (screed).

BACKGROUND OF THE INVENTION

Quality control in the field of asphalt laying is of great importance. The processing temperature of the new laid material is an important process variable in road construction which substantially influences the usage properties, such as stability, layer adhesion and service life of the laid pavements. Asphalt paving machines (pavers) typically distribute the paving material and carry out pre-compacting of a surface of the paving material with a screed, which is attached to the rear end of the paver and is drawn thereby. The laid pavement is subsequently compacted still further by rollers. Like other factors, such as environmental and weather conditions during laying, the temperature of the material in different stages of the laying process influences the efficiency and the success of a paving job.

Processing the material under optimum temperature conditions has long been recognized as important, but such processing often entails manual control measurements on the part of the support and operating staff. Paving material is typically obtained at a comparatively high temperature at an asphalt or bitumen plant. Depending on the distance a supply machine has to travel so as to reach a work site as well as on the traffic and the ambient temperature, the asphalt may cool to a certain extent prior to delivery. In addition, progress of the paving machines and of the compacting machines or rollers may vary.

The extent of cooling, once the paving material has finally reached the paving machine or paver, may vary depending on the temperature of the paving material at delivery, environmental factors, etc. In some cases, paving material may segregate within the paving machine, and thus relatively cooler and relatively hotter pockets or accumulations of material within the machine may exist, leading to unexpected, mostly punctual, temperature gradients in the paving material once the latter is distributed on the work surface. In a typical laying process, the paving material is discharged, distributed by the paving machine or paver, and subsequently pre-compacted by means of the screed, and is then ready to be compacted still further by the various compacting machines. In the course of this process, the material temperature can deviate significantly from an expected temperature. In addition, the material temperature may be non-uniform from one paved region to the next due to changing weather conditions or due to unintended segregation or poor mixing.

Due to the importance of the laying temperature of the pavement in the laying process, measuring of the laying temperature becomes increasingly important. Known systems measure for this purpose the laying temperature behind the paver, in particular behind the screed. A plurality of conventional approaches are present which are based on thermography.

The EP 2 789 741 A1 describes a road finishing machine with a thermographic device, fixed to a portion of the machine for recording a georeferenced thermographic data record of at least one region of a pavement layer. The road finishing machine comprises a display on which all measuring results of the thermographic device may be indicated and which offers the possibility of suggesting improved paving parameters to the operator, based on the measuring results of the thermographic device.

The EP 2 982 951 A1 describes a thermography module for road finishers, with a temperature measuring device, imaging means and an evaluation unit. The evaluation unit is configured to determine a deviation area if, based on sensed temperature values, one or more deviation criteria are met.

The CN 102691251 A describes a paver asphalt temperature segregation infrared detection system and a detection method. The system provides real-time monitoring of the measured temperature during asphalt paving. Adverse factors generated during asphalt paving can be obtained with the monitoring results, and a solution scheme can be formed at a first time. The adverse factors can be controlled, and their effects can be reduced or completely eliminated, which ensures the paving quality.

The WO 00/70150 A1 describes a pavement temperature monitoring system with a temperature sensor mounted on a rear end of a paver vehicle in such a way that the entire width of the formed mat can be scanned or imaged. A display device is capable of receiving a plurality of electrical signals from the temperature sensor and generating and displaying a graphical image of the formed mat temperature profile.

The DE 10 2008 058 481 A1 describes an asphalt system wherein the navigation of construction vehicles is based on a so-called position temperature model. The system determines where to best employ compacting vehicles on the basis of the initially assessed and then measured asphalt temperature.

Furthermore, EP 2 990 531 A1 and EP 2 666 908 A1 describe systems and methods for road finishers for determining a cooling behavior of a new paved asphalt mat.

Some of the known conventional documents describe to give the machine operator suggestions to improve machine parameters in case the measured temperature of the new laid paving material is below or above a predetermined temperature. But it is not really said that these suggestions given to the machine operator are right because none of the aforementioned documents of conventional technology deal with the exact root cause of such temperature deviations or analyze the real and true symptoms for the thermal segregation of the paving material which occur during the paving process. It depends mainly on the experience of the machine operator or the paving crew to change the right parameters of the machine to ensure that the paving material will be laid by a paver under optimum conditions. The entire conventional approaches did not provide a general concept for controlling the quality of the paving material.

SUMMARY

According to an embodiment, an apparatus for detecting the quality of a paving material distributed along a paving area may have: an interface for receiving at least one thermal profile of a portion of the paving area in which the paving material is distributed, the thermal profile comprises a plurality of temperature values assigned with respect to measurement points; a calculating unit for analyzing the at least one thermal profile in order to detect segregated spots of the paving material within a portion, wherein the analysis is performed by determining a first zone of measurement points arranged adjacent to each other and having temperature values within a predetermined range, wherein the first zone is at least partially surrounded by measurement points having temperature values out of the predetermined range; and by analyzing an orientation of the first zone with respect to a travel direction of the paver; and by assigning an indication, in particular an error indication, to the portion based on the analysis of the orientation.

According to another embodiment, a paver for distributing paving material may have an inventive apparatus.

According to another embodiment, a method for detecting the quality of a paving material distributed along a paving area, may have the steps of: receiving at least one thermal profile of a portion of the paving area in which the paving material is distributed, the thermal profile comprises a plurality of temperature values assigned with respect to measurement points; analyzing the at least one thermal profile in order to detect segregated spots of the paving material within a portion, wherein the analysis is performed by determining a first zone of measurement points arranged adjacent to each other and comprising temperature values within a predetermined range, wherein the first zone is at least partially surrounded by measurement points comprising temperature values out of the predetermined range; and by analyzing an orientation of the first zone with respect to a travel direction of the paver; and by assigning an indication, in particular an error indication, to the portion based on the analysis of the orientation.

Another embodiment may have a non-transitory digital storage medium having a computer program stored thereon to perform the inventive method for detecting the quality of a paving material distributed along a paving area, when said computer program is run by a computer.

An embodiment provides a method for controlling the quality of a paving material distributed along a paving area using a paver. The method comprises the two basic steps of receiving at least one thermal profile, e.g. from an infrared camera, belonging to a portion of the paving area in which the paving material is distributed and analyzing the at least one thermal profile in order to detect segregated spots of the paving material within the portion. The thermal profile comprises a plurality of temperature values assigned to respective measurement points, which may be arranged in accordance to a grid. The analyzing comprises three substeps, namely the determining of a first zone of measurement points arranged adjacent to each other and having temperature values within a predetermined range, wherein the first zone is at least partially surrounded by measurement points having temperature values out of the predetermined range. The next substep is analyzing an orientation of the first zone with respect to a travel direction of the paver (e.g. so as to determine wherein the first zone or substantially orientated along or perpendicular to the travel direction). The last substep is assigning an indication, in particular an error indication or the like, of a respective type to the portion based on the analyzing of the orientation.

According to an enhanced embodiment, the method comprises the step of analyzing a temperature deviation within the portion, e.g. so as to find out a deviation of the temperature values of the first zone from a minimum or maximum temperature value within the portion or from the temperature values belonging to measurement points surrounding the zone. According to another embodiment, the analyzing of the thermal profile comprises another substep, namely the determining of a second zone of measurement points (laying adjacent to each other and having temperature values within another predetermined range, wherein the second zone is at least partially surrounded by measurement points having temperature values out of another predetermined range or wherein the second zone abuts the first zone) and analyzing the orientation of the second zone with respect to the travel direction.

Embodiments of the present invention are based on the finding that there are some criteria like the orientation of temperature spots and the temperature deviations within an examined paving area enabling the real-time interpretation of the thermal data such that potential causes of segregation can be identified and automatic communication of possible solutions to the paving crew can be given. In order to support the paving crew a recognized pattern, in particular an error pattern or the like, within the thermal profile is identified and assigned to a predetermined pattern type or predetermined error type. The assignment of the pattern type or error type enables to output instructions/hints to the paving crew to avoid the typical causes for the pattern or errors (thermal segregation) of the respective type. An example for such a communication to the paving crew may be a real-time alert for a paving operator or paving supervisor in the event of severe segregation problems. The main advantage is that the described system analyzes the thermal data and gives advice by itself, without the help of the paving crew. It is therefore independent of the experience of the machine operator or paving crew or a paving specialist. Embodiments of the present invention also have the advantage that the measured temperature profile is analyzed continuously and without interruption by the system. When having a look at conventional technology, it is not guaranteed that the machine operator looks at the display of the operating and display unit during the paving process and detects every problem that may arise. As a result of the continuous monitoring, the overall quality of the road to be produced is increased.

According to another embodiment, the analyzing of the temperature deviation may have different variants. For example, for analyzing the temperature deviation a substep of determining a temperature gradient from one of the measurement points belonging to the first zone to one of the measurement points out of the zone may be performed in order to detect whether the temperature gradient is below or above a predefined threshold, e.g. 25 or 50° Fahrenheit (approximately 14 or 28° Celsius). In the US, the thresholds of 25 and 50° Fahrenheit are the standard variation definitions for 'moderate' and 'severe' segregation, whereby these threshold definitions have to be seen as an example and can vary in view of other paving practices with different materials, widths and depths. For example, classifications of below 25 degrees Fahrenheit (14 degrees Celsius) for minimal or no segregation, between 25 and 50 degrees Fahrenheit (14 and 28 degrees Celsius) for moderate segregation and above 50 degrees Fahrenheit (28 degrees Celsius) for severe segregation, over a 150 feet section are what work best for a lot of US paving practices. But it has to noted that these temperature and distances variables were chosen based on studies performed on projects consisting of average US paving practices. Alternatively or additionally, the point-to-point comparison may be performed for two different zones. According to another embodiment, all temperature values of a portion may be analyzed so as to determine the minimum and the maximum temperature within the portion. This enables to compare one of the temperature values of the first zone to the maximum or minimum temperature value within the portion.

According to another embodiment, different pattern or error indications can be detected. Here a differentiation between five types (type A to type E) may be done. An error or a pattern indication of the type A can, for example, be detected, when the first zone is arranged perpendicular or substantially perpendicular to the travel direction. Another indicator for an error or a pattern of a type A is the perpendicular arrangement of the first zone and a temperature variation below a predefined threshold of for example approximately 25 or else 50° Fahrenheit (approximately 14 or else 28° Celsius). An error or a pattern of the type A results in minimal to moderate end-of-load segregation which is seen as coarser locations in the paving material and/or have higher air voids. According to embodiments, an instruction can be output to an operator of the paver. The instruction may comprise one of the following comments:
  ensuring that rows are overlapping when placed;
  ensuring that row placement is not at too extreme distances in front of the paver; and
  ensuring that the pile height in paver hopper and/or material transfer vehicle hopper remains consistent and at acceptable levels.

According to another embodiment, an error or a pattern of type B can be indicated when the first zone and a second zone are arranged perpendicular to the travel direction and when at least one cold zone is arranged between a first and a second zone. The cold zone comprises temperature values which are reduced by at least 50 degrees Fahrenheit (at least 28 degrees Celsius) when compared to the temperature values of the first and second zones. Another indicator for an error or a pattern of type B is the above-described arrangement of the first, second and cold zone in combination with a high temperature variation above a predefined threshold of for example approximately 50 degrees Fahrenheit (approximately 28 degrees Celsius). An error or a pattern of type B indicates a severe end-of-load segregation. In case of an error or a pattern of type B, the method may, according to further embodiments, comprise the additional step of outputting an instruction to the operator having the following content:
  ensuring that rows are overlapping when placed;
  ensuring that a row is not being put down at distance in front of paving causing extreme cool down prior to the paver getting to the paving material;
  ensuring that the paver hopper and/or material transfer vehicle hopper are not being depleted and hopper wings are not being folded between loads; and
  ensuring proper multi-drop loading of trucks.

According to another embodiment, an error or a pattern of type C may be identified and indicated. An error or a pattern of type C is present, when the first zone and a second zone are arranged transversal/along the travel direction and when one or more cold zones are arranged in-between. Another additional indicator is a temperature variation (seen over the entire portion) of above a predefined threshold of for example approximately 50 degrees Fahrenheit (approximately 28 degrees Celsius). Such an error or a pattern of type C leads to false segregation and may be caused by prolonged stopping and excessive screed heat at slow paving speed. In this case, the method may output an instruction to the operator comprising the following content:
  minimizing stop times; and
  monitoring thermal images of screed stamps at stoppages and reduce screed temperature.

According to another embodiment a type D error or pattern may be indicated, wherein the first zone extends transversal along the travel direction and is centered. An additional indicator is a temperature variation below approximately 50° Fahrenheit (approximately 28° Celsius).

In this case, the method may output instructions to the operator comprising the following content:
  examining material movement at the site to determine, if other extensions would be needed for the consistent flow;
  considering adding mainframe extensions; and
  ensuring that the kickback pedals are in good conditions.

According to another embodiment, an error or a pattern of type E may be indicated when a first zone, a second zone and a third zone divide the portion into different zones along the travel direction, i.e. at least three perpendicularly arranged zones. Here, an additive indicator is the temperature variation above a predefined threshold of for example approximately 50° Fahrenheit (approximately 28° Celsius). An error or a pattern of type E results in a load-to-load segregation. Here, the method may output the instruction to the operator of:
  ensuring consistent tracking operations; and
  ensuring consistent mixing plant operations.

Regarding the above method, it should be noted that according to an embodiment, a plurality of portions of the area are investigated by the above method. The plurality of portions typically overlap each other since the analysis of the segregation is performed continuously, wherein the overlap results from the traveling of the paver along the traveling direction.

Another embodiment provides an apparatus for performing the above method, namely an apparatus for detecting the quality of a paving material distributed along a paving area. The apparatus comprises at least an interface for receiving the thermal profile, and a calculator for performing their analysis.

According to an embodiment, the apparatus may additionally comprise a thermal profile camera or asphalt temperature scanner for recalling the one or more thermal profiles. According to an additional embodiment, the apparatus may comprise a position sensor, like a GPS sensor for measuring the position of the paving machine continuously and to add position information to the temperature profile and the advice given by the inventive temperature measurement system. Note, according to embodiments, the position sensor of the apparatus is configured to provide a position information to the at least one portion. According to another embodiment, the apparatus comprises a mobile device or a display for outputting the information/instructions. This mobile device or display enables an invent monitoring. According to another embodiment, the apparatus comprises a wireless communications module, which is configured to send a real-time alert in the event of severe segregation problems and/or no segregation problems via a wireless communications link to:
  a mobile device (Smartphone and/or Smartwatch) of the supervisor of the construction site;

a computer, Tablet-PC or the like in a supervisor office far away or nearby the construction site;

one or more roller compactor drivers behind the asphalt paving machine so that the roller drivers can be informed about problems with the asphalt paving process. The roller drivers can then for example adjust, modify or optimize parameters, settings, etc. of the roller compactor; and/or a data server far away so that for example truck drivers and/or the crew of an asphalt mixing plant can be informed about problems with the asphalt material.

The real-time alert can be sent for example via a CAN-WLAN-Gateway module (wireless communications module), which is arranged on the machine and is an interface between a machine communications bus system, for example CAN (Controller Area Network) or the like, and a wireless communications system, for example WLAN, Bluetooth or the like.

In the event of no segregation problems, such a real-time alert can be for example outputting a positive message or confirmation when there are not any (error) indications in a specified section or distance of approximately 150 feet.

Another embodiment provides a computer program for performing the above method. An additional embodiment provides a paver comprising the above discussed apparatus.

The embodiments of the present invention have the advantage to give contractors a means to positively affect quality of a paving material distributed along a paving area using a paver.

BRIEF DESCRIPTION OF THE DRAWINGS

Embodiments of the present invention will be detailed subsequently referring to the appended drawings, in which:

FIG. 1b shows a schematic representation of a paving area for illustrating the principle of analyzing a thermal profile according to the first embodiment;

DETAILED DESCRIPTION OF THE INVENTION

Figure 1A:
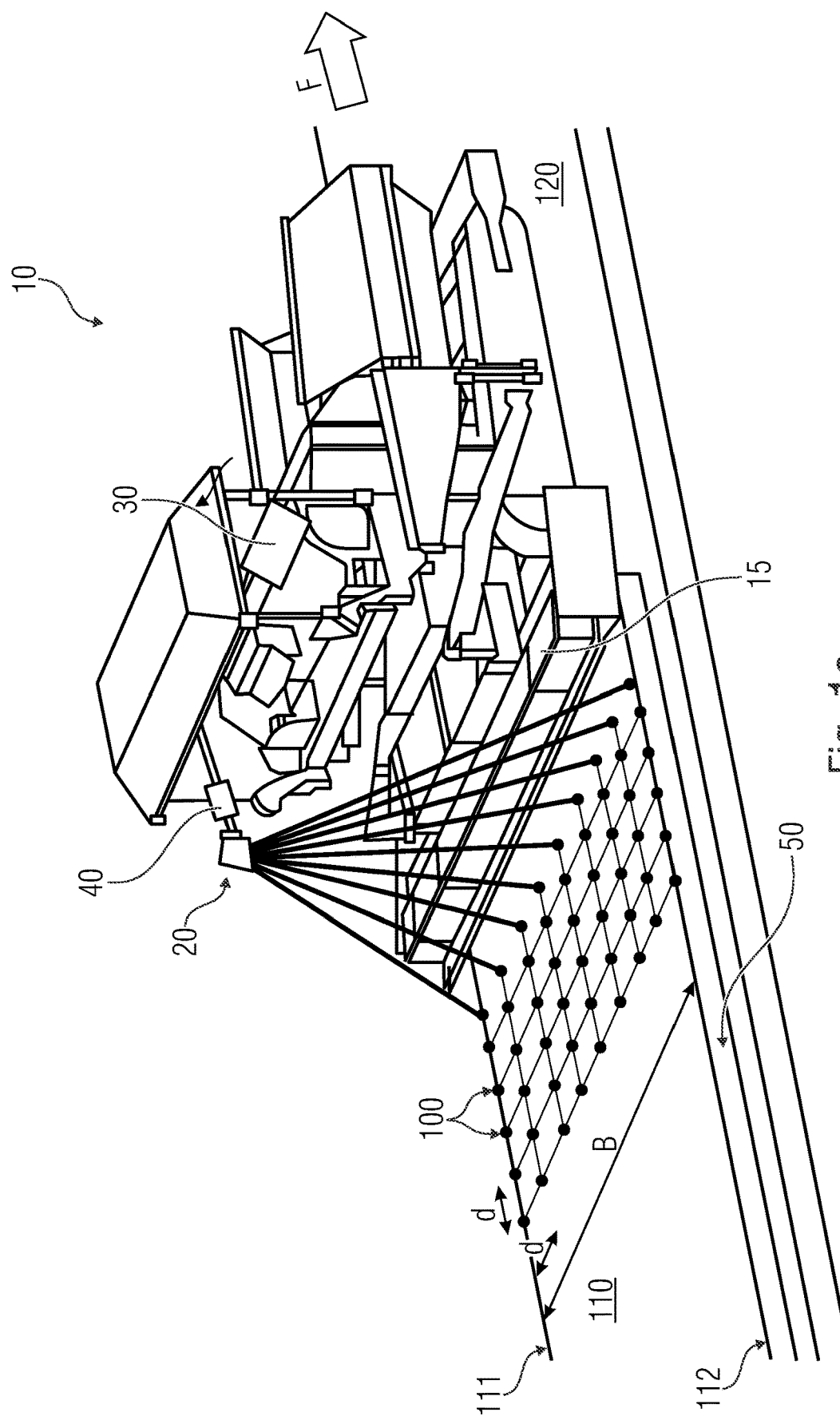
FIG. 1a shows a schematic representation of a paver, here an asphalt paving machine comprising an apparatus for controlling the quality of the distributed paving material according to a first embodiment.

Below, the present invention will subsequently be discussed referring to the figures, wherein identical reference numerals are provided to elements having identical or similar function so that the description thereof is mutually applicable and interchangeable.

In FIG. 1a a road finishing machine 10, e.g. an asphalt paving machine, is schematically illustrated. The direction of travel of the road finishing machine 10 is illustrated by an arrow F on the ground 120. To distribute the paving material on the ground 120 and to form a road surface 50, the machine 10 comprises a screed 15, which is attached to the rear end of the machine 10.

Furthermore, the machine 10 comprises a temperature measurement unit 20 at its back end, which can for example be a thermal profile camera or an asphalt temperature scanner. An optional weather station 40, which exemplarily determines the wind speed and the ambient temperature in the region of the road finishing machine 10, is also arranged in the region of the temperature measurement unit 20. The temperature measurement unit 20 measures the temperature of the surface 110 of the newly applied road surface 50 over the road width B which is limited laterally, i.e. transverse to the direction of travel of the road finishing machine 10, by the outer edges 111 and 112. Thus, the measuring values are recorded at the measuring points 100 illustrated schematically and arranged in not necessarily equal distances d transverse and/or along to the direction of travel of the road finishing machine 10.

Dependent on the exact implementation of the measurement unit 20, the measurement points 100 may be arranged in order to record a temperature profile having two dimensions or just may be arranged transversal to the travel direction F, such that the thermal profile having the two dimensions is recorded during the traveling along the travel direction F and composed by a plurality of measurements along the travel direction F.

Figure 2:
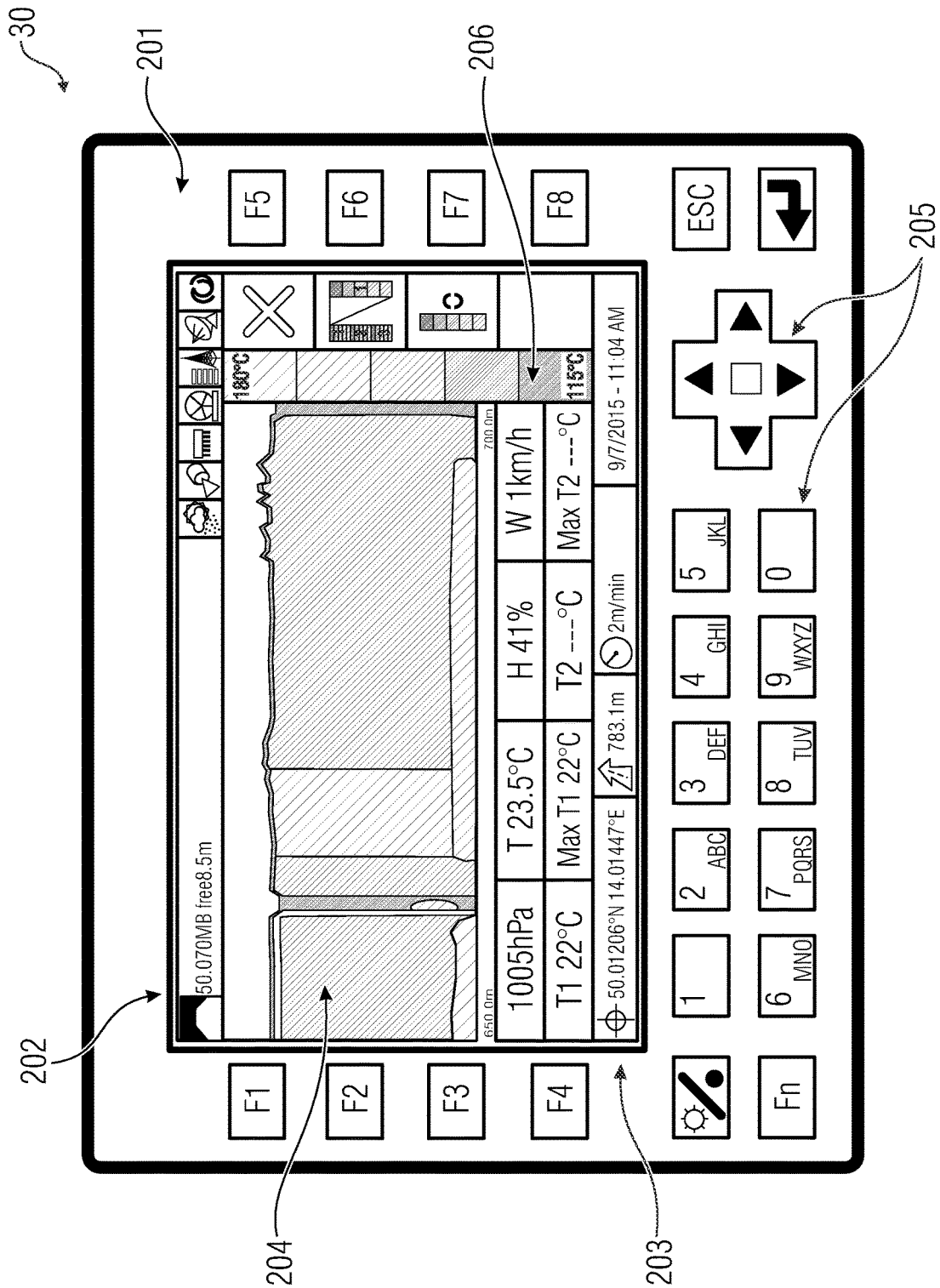
FIG. 2 shows a schematic representation of a control unit belonging to the apparatus for controlling the quality.

The road finishing machine 10 of FIG. 1a may comprise an operating and display unit 30 which is electrically connected to the temperature measurement unit 20, which comprises at least a CPU for performing the analysis. The operating and display unit 30 can be mounted near the control platform of the paver, as shown in FIG. 1a. But it is also possible that the operating and display unit 30 is mounted at any other point of the machine, for example at the screed 15, so that the paving crew can view to the display screen easily. The operating and display unit 30 is comparable to a mobile computer and comprises at least a microcontroller, one or more memory units (RAM, ROM, Flash . . . ) and one or more input and output devices, for example a touch display screen. The operating and display unit 30 shows the measured temperature profile of the surface 110 of the newly applied road surface 50 as a graphical illustration on an output device (display screen), as shown in FIG. 2. Examples of such a graphical illustration are shown in FIGS. 4 to 9 and described in more detail later on.

A machine operator or the paving crew (not shown) are able to see the measured temperature profile of the new paved road 50 on the display screen of the operating and display unit 30. FIG. 2 shows an example of a front side 201 of an operating and display unit 30. In the middle area is a display screen 202, advantageously a touch display screen. Left, right and below the display screen 202 are a lot of input keys 205. In the middle area of the display screen 202, a measured temperature profile 204 is graphical illustrated. Above, right and below the temperature profile 204, some symbols 203 are shown. Some of the symbols 203 show data or information of the current paving process, for example paver speed of 2 m/min, wind speed of 1 m/min, humidity of 41% and so on.

For the operator or the paving crew, the information shown by the unit 30 is very helpful, wherein the information has to be continuously monitored. In order to improve the reliability an automatic controlling of the paving quality can be performed, when rules are present for interpreting the thermal pattern. This approach will be discussed referring to FIG. 1b.

FIG. 1b shows a schematic illustration of the paving area 47, along which the paving material 15 has been distributed using a paver which travels along the traveling direction F. The surface 110 of the newly applied road 50 is analyzed using a thermal profile camera, or an asphalt temperature scanner, as discussed with respect to FIG. 1a. The means for determining the thermal profile capture at least a portion of the area 47, which is marked by the reference numeral 49. Within the portion 49 of a plurality of measurement points 100 are arranged, for each measuring point a respective temperature value is available.

Measurement points arranged next to each other and having comparable temperatures, i.e. temperature values within a predetermined ranged, i.e. between 170 to 190° Celsius can be grouped to a common zone.

Here, exemplarily, a first zone 51a and a second zone 51b are shown. The first zone 51a is arranged perpendicular to the travel direction F, i.e. transversal with respect to the pavement 15, wherein the zone 51b is arranged along the travel direction F. Both zones 51a and 51b are typically surrounded by a plurality of measurement points having temperature values out of the predetermined range. Alternatively, two zones may be arranged next to each other, such that just a few or nearly no measurement points out of the predetermined ranges are arranged in-between. In general it should be noted that each zone 51a and 51b is formed by a temperature deviation between the local spot and the surroundings.

The orientations along which the zones 51a and 51b are arranged give a good hint to the causes for the temperature variations. Another indicator to different causes is the temperature deviation itself. Here, a plurality of approaches can be performed. For example, the temperature deviation between a zone, e.g. 51a and the surrounding can be analyzed. According to another approach, the temperature deviation between the two zones 51a and 51b can be detected. Alternatively or additionally, the temperature within one zone of the average temperature within one zone (e.g. within the zone 51a) can be compared to a minimum or a maximum temperature value of the portion 49.

Regarding each zone 51a and 51b it should be noted typically the temperature deviation within a corresponding zone 51a and 51b amounts to the maximum of 30% or 20% or according to embodiments to at least 10%, wherein the percentage refers to±from the average temperature within the zone 51a and 51b.

The above mentioned automatic approach for controlling the paving quality comprises the step of determining the corresponding zones 51a and/or 51b and analyzing the orientation of the first zone. Based on the orientation and, according to further embodiments, in combination with a temperature deviation, an assignment of an indication, in particular an error indication or the like, can be performed for the respective portion 49.

Starting from this assignment throughout a respective pattern type or error type (type A-type E), an instruction to the operator helping him to improve the recent situation can be output. This step of outputting the instruction may be performed by use of the display unit 30 or the mobile device.

Below, with respect to FIGS. 4 to 9 different temperature profiles will be discussed, wherein each temperature profile can be assigned to a respective pattern indication or error indication. FIGS. 4 to 9 show several different measured temperature profiles of the new paved road 50, respectively the surface 110 of the newly applied road surface 50 over the road width B, whereby the different hatching in the illustrated graphics stand for different temperatures shown in hatching temperature gradient pursuant to FIG. 3. Other temperature gradients (e.g. color gradients, like Rainbow temperature color gradient or Iron temperature color gradient) are known, for example, see reference sign 206 in FIG. 2.

Figure 3:
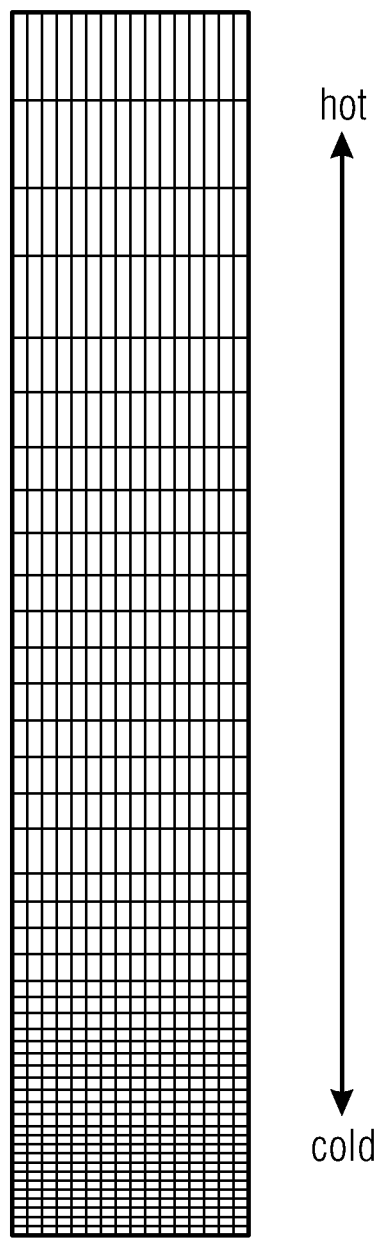
FIG. 3 shows a schematic caption indicating different temperature levels of thermal profiles.

In FIG. 3, and also in FIGS. 4 to 9, hot temperatures are marked by a closer hatching, cold temperatures are marked by a lighter hatching, whereby hot temperature means a temperature of approx. 356° Fahrenheit (approx. 180° Celsius) and cold temperature means a temperature of approx. 203° Fahrenheit (approx. 95° Celsius).

Figure 4:
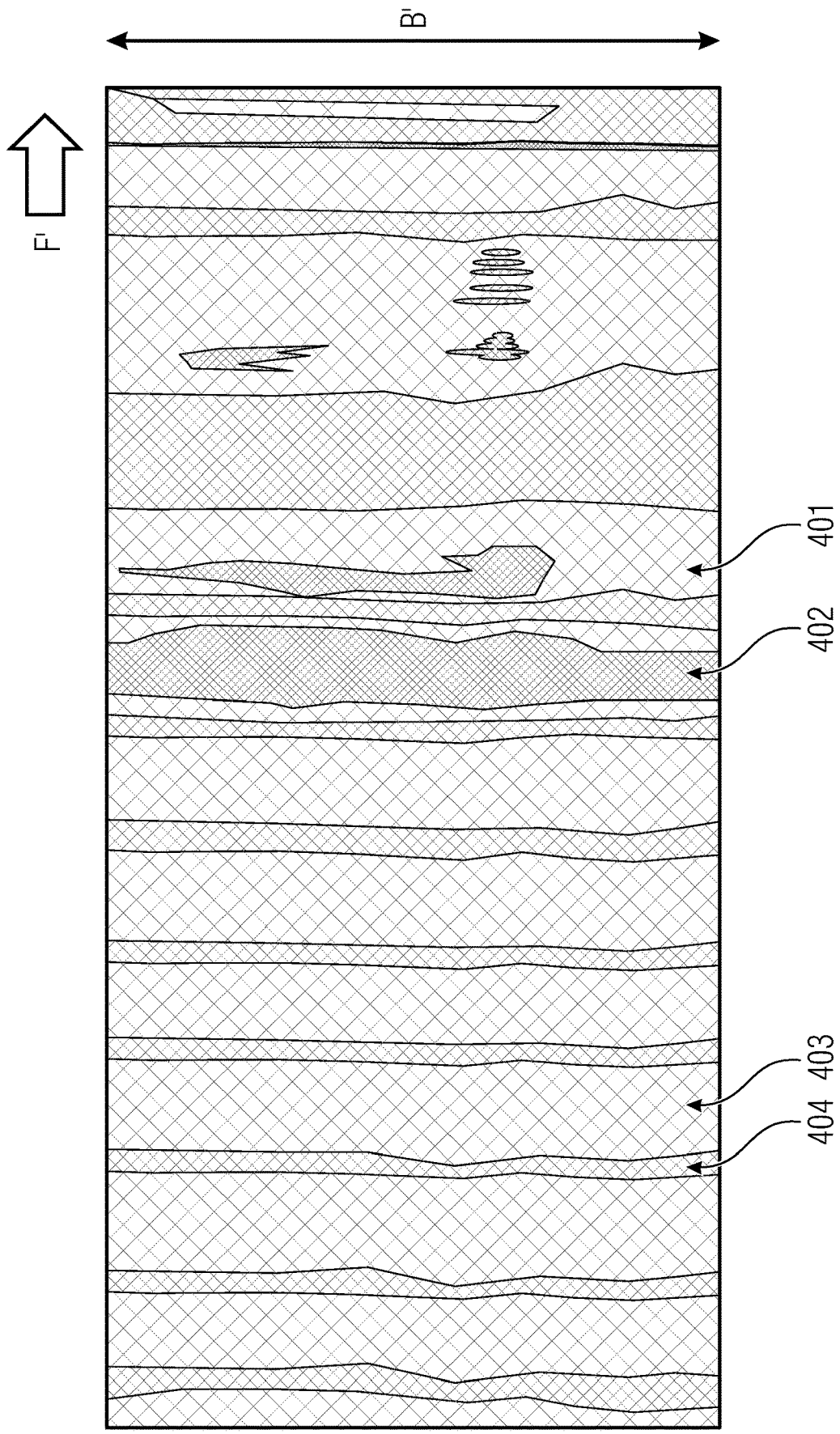
FIGS. 4-8 show a schematic thermal profile belonging to distributed pavements having areas assigned to different pattern types or error types for illustrating the principle of determining the different pattern types or error types within the thermal profiles according to embodiments.

The distance B' and the direction F', only shown in FIG. 4 but applies to all FIGS. 4 to 9, correspond to the road width B of the newly applied road surface 50 and the direction of travel F of the road finishing machine 10 (see FIG. 1a). FIGS. 4 to 9 show in detail different thermal segregation problems which can occur during a paving process. In the following, the measured temperature profiles, the thermal segregation problems, its root causes and possible solutions are described in more detail.

Some parts of the following description refer to a so called windrow paving. In such pavers, the hot paving material is not dumped directly into the paver hopper. Instead, it is deposited as a windrow directly on the roadway ahead of the paver. Such windrow pavers provide a loader conveyor which picks up the paving material and loads it into a hopper. Thereafter, the paving material moves by a second conveyor to a location ahead of a lateral auger and screed in the same general manner as paving machines with a hopper which receive hot asphalt paving material directly from a dump truck.

FIG. 4 shows a typical temperature profile of a pattern indication or an error indication of type A. Here, the thermal variation levels show minimal to moderate end-of-load segregation, which is typically seen as a coarser location in the asphalt matter and will have higher air voids making the asphalt more susceptible to early distress due to oxidation, moisture penetration or resulting in raveling and pot holes.

The variation temperature sections, for example, rows 401 to 404 of FIG. 4 have different temperature deviations (thermal variation levels) transversally to the direction of the travel F, F', of the road-finishing machine 10. As can be seen in this example, the overall temperature deviation is limited to approximately 50° Fahrenheit (approximately 28° Celsius).

In order to improve the shown situation, there are three possible solutions. If windrow paving, ensure rows are overlapping when placed. If windrow paving, ensure row placement is not to extreme distances in front of paver. Ensure pile height in paver hopper and/or material transfer vehicle (material feeder) hopper remain consistent and at acceptable levels.

Figure 5:
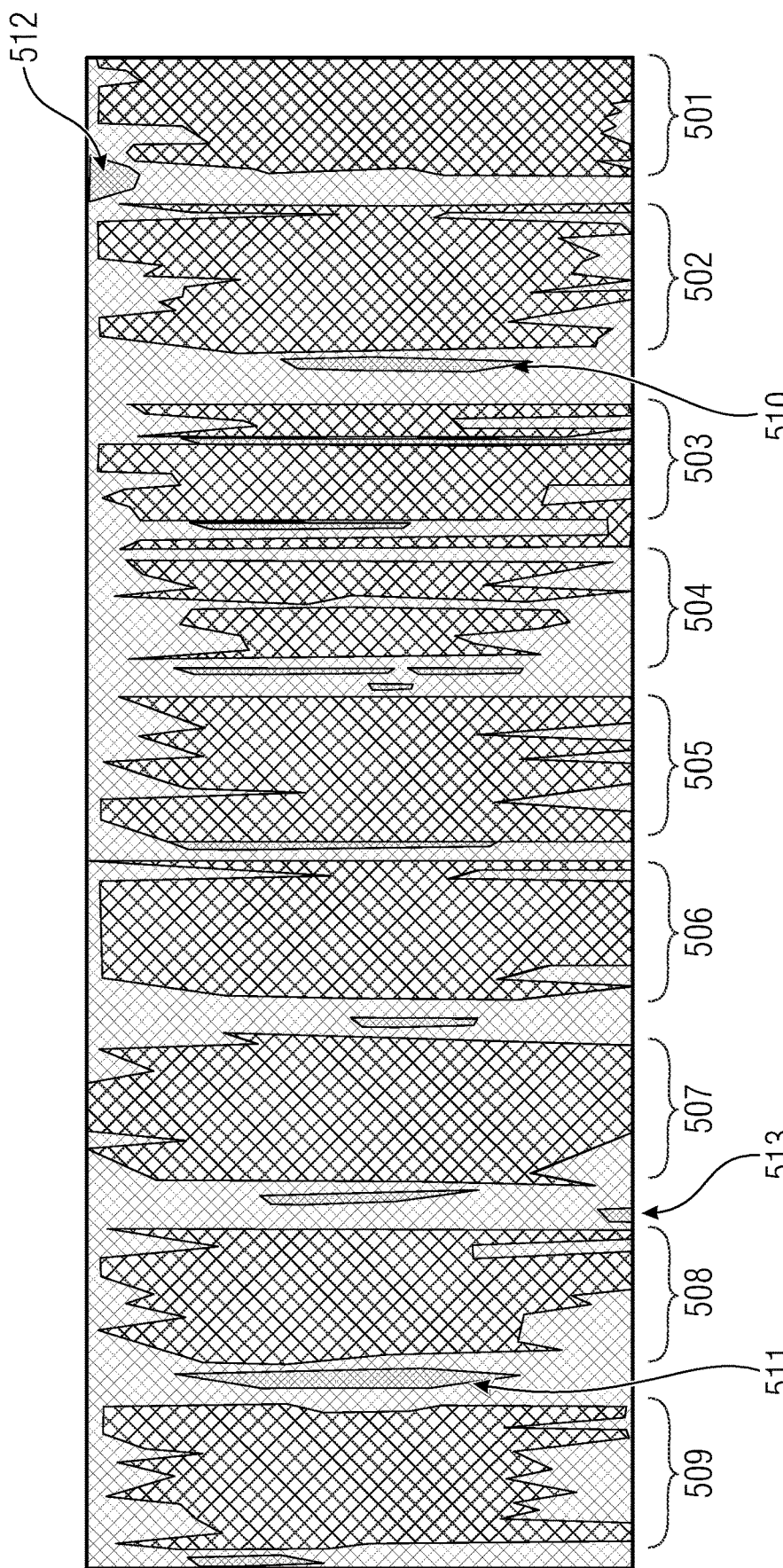

FIG. 5 shows thermal variation levels having severe end-of-load thermal segregation, which affects the long-term durability of the asphalt pavement concrete structure. This pattern or error indication is the type B.

The thermal pattern shows various temperature sections (see rows 501 to 509) with high temperature deviations (thermal variation levels) transversely to the direction of travel F, F' of the road finishing machine 10. Small sections of cold temperature are between some rows (see 510 and 511) and also near the outer edges (see 512 and 513).

A possible solution would be: If windrow paving, ensure rows are overlapping when placed. If windrow paving, ensure row is not being put down at distances in front of paver causing extreme cool down prior to paver getting to material. Ensure paver hopper and/or material transfer vehicle (material feeder) hopper are not being depleted and hopper wings are not being folded between loads. If end dumping into paver hopper, ensure proper multi-drop loading of trucks. Environmental conditions may dictate the need of a material transfer vehicle (material feeder) in the operation for remixing of segregated material.

Figure 6:
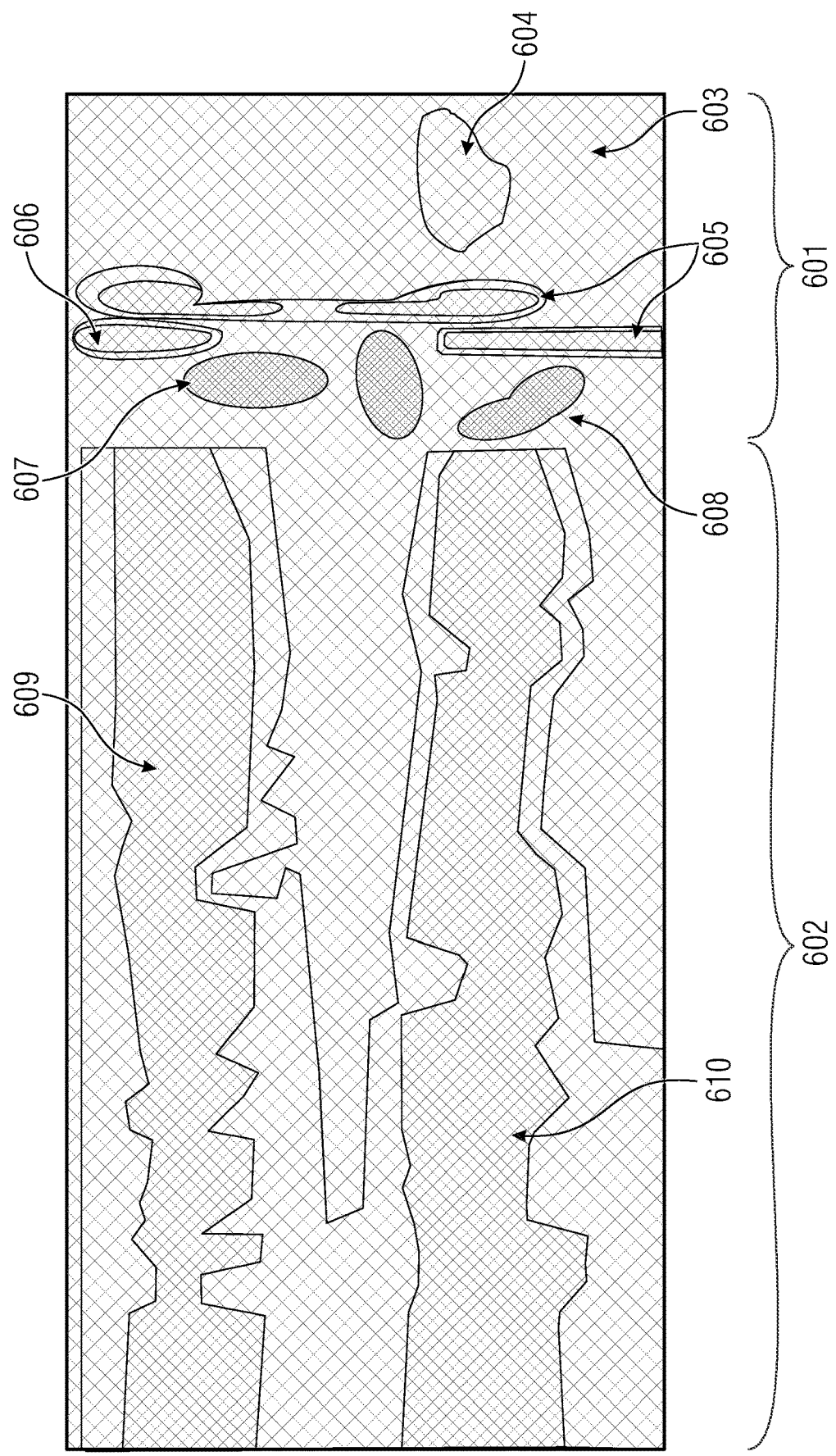

With respect to FIG. 6 a pattern or an error of type C will be discussed. The thermal image of FIG. 6 shows a false segregation caused by prolonged stopping and excessive screed heat at low paving speeds. FIG. 6 shows two different areas 601 and 602 with various temperature sections. In area 601 there are several temperature sections with high temperature deviations (thermal variation levels). Sections 603 and 604 are in the medium temperature range of approx. 140 to 150° Celsius. Sections 605 and 606 are in a high temperature range of approx. 170 to 180° Celsius and run transversely to the direction of travel F, F' of the road finishing machine 10. Sections 607 and 608 are spots in the low temperature range of approx. 95 to 105° Celsius. In area 602 there are mainly two temperature sections 609 and 610 in a high temperature range alongside to the direction of travel F, F' of the road finishing machine 10.

A possible solution would be: Minimize stopping times. Monitor thermal image for screed stamps at stoppages and reduce screed temperature if possible.

Figure 7:
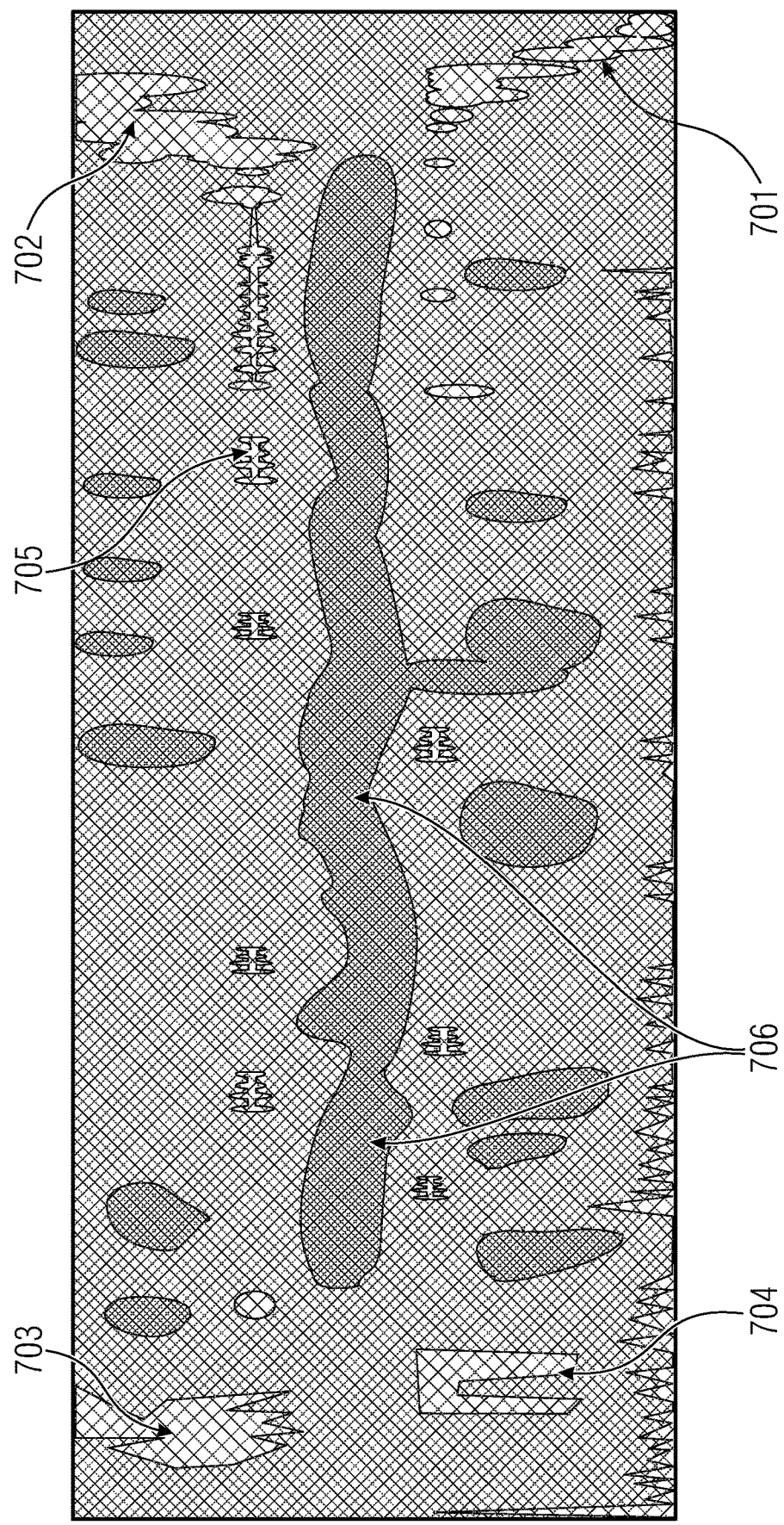

With respect to FIG. 7 a pattern or an error of type D will be discussed. FIG. 7 shows a temperature profile with some areas of thermal streaking. The image in FIG. 7 contains minimal variation due to streaking but moderate to severe thermal streaking can result in continuous segregation throughout the mat. There are mainly shown four areas 701 to 704 in a middle temperature range, whereby the area 705 shows a linear region alongside to the direction of travel F, F' of the road finishing machine 10 also in a middle temperature range. The linear region 705 starts in 702 and ends in 703. Furthermore, the area defined by the sections 706 show a center-line area in a very high temperature range (up to 180° Celsius).

Possible solution: Examine material movement at the sides to determine if auger extensions would be needed for consistent flow. If material is moving forward in the end gates you may also consider adding main frame extensions. Regarding center-line streaking check to ensure the kickback paddles are in good condition. If so, raise flow gates and/or auger height.

Figure 8:
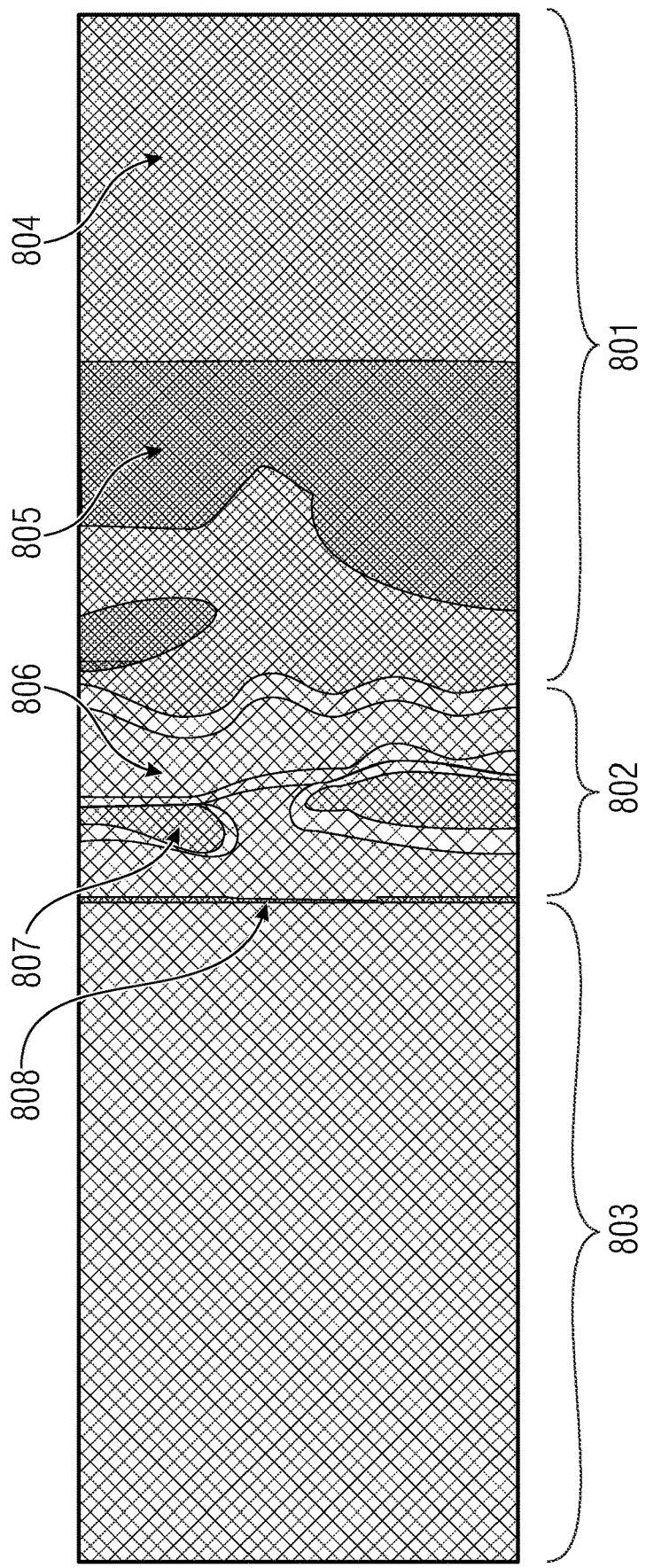

FIG. 8 describes an area inclination of the pattern or error type E. FIG. 8 shows a terminal image of a pavement having load-to-load segregations. FIG. 8 shows three different areas 801, 802 and 803 with various temperature sections. Areas 801 and 802 show several main temperature sections 804 to 807 in a middle and high temperature range and transversely to the direction of travel F, F' of the road finishing machine 10. Between area 802 and 803 there is a small border which indicates a paver stop. Area 803 shows comparable to the other both areas 801 and 802 no thermal variation levels. Possible solution: Ensure consistent trucking operations. Ensure consistent mixing plant operations.

Figure 9:
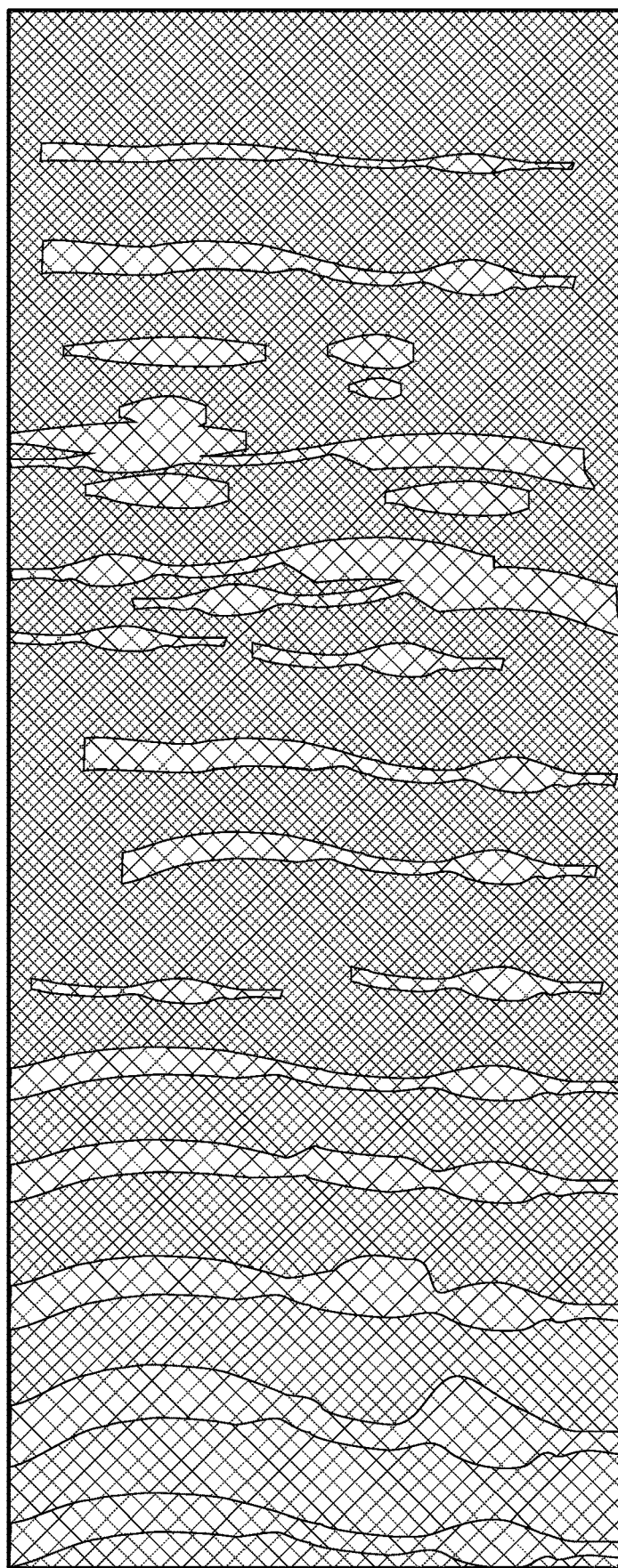
FIG. 9 shows a schematic thermal profile belonging to a distributed pavement segregation symptoms.

Just for the sake of completeness, a temperature profile showing minimal to no segregation is illustrated by FIG. 9. As can be seen, the thermal variation levels are consistently below approximately 25° Fahrenheit (approximately 14° Celsius) or less.

As discussed above, the analyzing of the temperature pattern is performed automatically, e.g. by the operating and display unit 30 (cf. FIG. 1) or a CPU of the temperature measurement system. Based on the analysis, the system can output using a mobile device or display instructions for the operator and the crew. The instructions can comprise a real-time per load. The real-time alert can include further information, for example the analyzed potential causes of segregation and/or the suggested possible solutions given to the paving crew. Out of the given alert and provided information, the truck drivers and/or asphalt mixing plant crew can adjust, modify or optimize parameters, settings, etc. of the asphalt production and transportation process. These could be for example to change the temperature of the asphalt mixing process or to minimize the number of trucks which are on the way from the asphalt mixing plant to the construction site (in order to minimize a waiting time of the asphalt trucks in front of the asphalt paving machine).

According to another embodiment, the output of your instructions can be performed using network technologies, such that the instructions can be given to the asphalt mixing plant, if the occurred segregation problems are caused by the wrong asphalt mixture.

Although within the above embodiments, the temperature measurement unit has been characterized as a thermal profile camera or asphalt temperature scanner directed to the new paved asphalt mat behind the asphalt paving machine, it should be noted that also other measurement principles, like the usage of a plurality of sensors are possible, if the measurement principle enables to capture a thermal profile.

According to another embodiment, a so-called learning modus can be used. For the real time interpretation of the thermal data in the software of the operating and display unit it is needed to have thermal data patterns stored in the memory of the operating and display unit in order to compare it with current measured temperature profiles.

To improve the system, it can be set in a Learning- or Teach-In-Modus in order to add new thermal data patterns (new thermal profile layouts describing root causes of thermal segregation). It can be involved that the machine operator or the paving crew or a paving specialist has to validate the decisions taken by the system.

In the following, additional embodiments and aspects of the invention will be described which can be used individually or in combination with any of the features and functionalities and details described herein.

According to a first aspect, a method for controlling a quality of a paving material distributed along a paving area using a paver, comprises: receiving at least one thermal profile of a portion of the paving area in which the paving material is distributed, the thermal profile comprises a plurality of temperature values assigned to respective measurement points; analyzing the at least one thermal profile in order to detect segregated spots of the paving material within the portion, wherein the analyzing comprises: determining a first zone of measurement points arranged adjacent to each other and having temperature values within a predetermined range, wherein the first zone is at least partially surrounded by measurement points having temperature values out of the predetermined range; analyzing an orientation of the first zone with respect to a travel direction of the paver; assigning an indication to the portion based on the analyzing of the orientation.

According to a second aspect when referring back to aspect 1, the step of analyzing the orientation is performed so as to determine whether the first zone is substantially orientated along or perpendicular to the travel direction.

According to a third aspect when referring back to aspect 1, the analyzing the at least one thermal profile comprises the step of determining a second zone of measurement points arranged adjacent to each other and having temperature values within another predetermined range, wherein the second zone is at least partially surrounded by measurement points having temperature values out of the another predetermined range or wherein the second zone abuts to the first zone; wherein the analyzing the at least one thermal profile comprises the step of analyzing the orientation of the second zone with respect to the travel direction of the paver.

According to a fourth aspect when referring back to aspect 1, the method comprises the step of analyzing a temperature deviation within the portion.

According to a fifth aspect when referring back to aspect 4, the step of analyzing the temperature deviation comprises the substep of determining a temperature grading from one of the measurement points of the first zone to one of the measurement points surrounding the first zone; and/or the step of analyzing the temperature deviation comprises the substep of comparing a temperature value of one of the measurement points of the first zone to a temperature value of a measurement point belonging to a second zone; and/or the step of analyzing the temperature deviation comprises the substep of analyzing all temperature values of the portion so as to determine the minimum and the maximum temperature value; and/or the step of analyzing the temperature deviation comprises the substep of comparing one of the temperature values of the first zone to a maximum or/or minimum temperature value of the portion.

According to a sixth aspect when referring back to aspect 1, the step of assigning the indication, in particular an error indication, outputs an indication of the type A, when the first zone is arranged perpendicular to the travel direction; or when the first zone is arranged perpendicular to the travel direction and when a temperature variation is below 50 degrees Fahrenheit.

According to a seventh aspect when referring back to aspect 6, an indication, in particular an error indication, of type A results in a minimal to moderate end-of-load segregation; and/or the method further comprises the step of outputting an instruction to an operator of the paver, wherein the instruction comprises one of the following contents: ensuring that rows are overlapping when placed; ensuring that row placement is not at too extreme distances in front of the paver; and ensuring that the pile height in paver hopper and/or material transfer vehicle hopper remains consistent and at acceptable levels.

According to an eighth aspect when referring back to aspect 1, the step of assigning the indication, in particular an error indication, outputs an indication of type B, when the first zone and a second zone are arranged perpendicular to the travel direction and when a cold zone is arranged between the first zone and the second zone, wherein the cold zone comprises temperature values which are reduced by at least 50 degrees Fahrenheit when compared to the temperature values of the first and second zones; or when the first zone and a second zone are arranged perpendicular to the travel direction and when a cold zone is arranged between the first zone and the second zone, wherein the cold zone comprises temperature values which are reduced by at least 50 degrees Fahrenheit when compared to the temperature values of the first and second zones and when a temperature variation is above 50 degrees Fahrenheit.

According to a ninth aspect when referring back to aspect 8, an indication, in particular an error indication, of the type B leads to severe end-of-load thermal segregation; and/or the method comprises the step of outputting an instruction to the operator of the paver, wherein the instruction comprises one of the following contents: ensuring that rows are overlapping when placed; ensuring that a row is not being put down at a distance in front of paving causing extreme cool down prior to the paver getting to the paving material; ensuring that the paver hopper and/or material transfer vehicle hopper are not being depleted and hopper wings are not being folded between logs; and ensuring proper multi-drop loading of trucks.

According to a tenth aspect when referring back to aspect 1, the step of assigning the indication, in particular an error indication, outputs an indication of type C, when the first zone and a second zone are arranged along the travel direction and when a cold zone is arranged between the first and the second zones, wherein the cold zone comprises temperature values reduced by at least 50 degrees Fahrenheit when compared to the temperature values of the first and second zones, or when the first zone and a second zone are arranged along the travel direction and when a cold zone is arranged between the first and the second zones, wherein the cold zone comprises temperature values reduced by at least 50 degrees Fahrenheit when compared to the temperature values of the first and second zones and when the temperature variation is above 50 degrees Fahrenheit.

According to an eleventh aspect when referring back to aspect 10, an indication, in particular an error indication, of type C results in false segregation; and/or wherein the method comprises the step of outputting an instruction to an operator of the paver, wherein the instruction comprises one of the following contents: minimizing stop times; and monitoring thermal images of screed stamps at stoppages and reduce screed temperature.

According to a twelfth aspect when referring back to aspect 1, the step of assigning the indication, in particular an error indication, outputs an indication of type D, when the first zone extends along the travel direction and is centered, or when the first zone extends along the travel direction and is centered and when a temperature variation is below 50 degrees Fahrenheit.

According to a thirteenth aspect when referring back to aspect 12, the method comprises the step of outputting an instruction to an operator of the paver, wherein the instruction comprises one of the following contents: examining material movement at the site to determine if other extensions would be needed for the consistent flow; considering adding main frame extensions; and ensuring that the kickback pedals are in good conditions.

According to a fourteenth aspect when referring back to aspect 1, the step of assigning the indication, in particular an error indication, outputs an indication of type E, when the first zone, a second zone and the third zone divide the portion into different zones along the travel direction, or when the first zone, a second zone and the third zone $51c$ divide the portion into different zones and when a temperature variation is above 50 degrees Fahrenheit.

According to a fifteenth aspect when referring back to aspect 14, an indication, in particular an error indication, of type E results in a load-to-load segregation; and/or, when the method comprises the step of outputting an instruction to an operator of the paver, the instruction comprises one of the following contents: ensuring consistent tracking operations; and ensuring consistent mixing plant operations.

According to a sixteenth aspect when referring back to aspect 1, the plurality of measurement points within the at least one thermal profile is arranged in accordance to a regular grid.

According to a seventeenth aspect when referring back to aspect 1, the predetermined range is defined by a maximum deviation of the temperature values, wherein the maximum deviation amounts to 20%.

According to an eighteenth aspect when referring back to aspect 1, the method is performed for the plurality of temperature profiles and wherein the method is performed for the plurality of temperature profiles overlapping each other.

A nineteenth aspect relates to a non-transitory digital storage medium having a computer program stored thereon to perform the method for controlling a quality of a paving material distributed along a paving area using a paver, the method comprising: receiving at least one thermal profile of a portion of the paving area in which the paving material is distributed, the thermal profile comprises a plurality of temperature values assigned to respective measurement points; analyzing the at least one thermal profile in order to detect segregated spots of the paving material within the portion, wherein the analyzing comprises: determining a first zone of measurement points arranged adjacent to each other and comprising temperature values within a predetermined range, wherein the first zone is at least partially surrounded by measurement points comprising temperature values out of the predetermined range; analyzing an orientation of the first zone with respect to a travel direction of the paver; assigning an indication to the portion based on the analyzing of the orientation, when said computer program is run by a computer.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for detecting the quality of a paving material distributed along a paving area, the apparatus comprising:
    an interface for receiving at least one thermal profile of a portion of the paving area in which the paving material is distributed, the thermal profile comprising a plurality of temperature values assigned with respect to measurement points; and
    a calculating unit for analyzing the at least one thermal profile in order to detect segregated spots of the paving material within the portion, wherein the analysis is performed by determining a first zone of measurement points arranged adjacent to each other and comprising temperature values within a predetermined range, wherein the first zone is at least partially surrounded by measurement points comprising temperature values out of the predetermined range; by analyzing an orientation of the first zone with respect to a travel direction of a paver; and by assigning an indication to the portion based on the analysis of the orientation; wherein analyzing the orientation is performed so as to determine whether the first zone is substantially orientated along or perpendicular to the travel direction.

2. The apparatus according to claim 1, wherein the apparatus comprises a thermal profile camera or an asphalt temperature scanner and is configured to record the at least one thermal profile of the portion of the paving area when directed to the paving area.

3. The apparatus according to claim 1, wherein the apparatus comprises a position sensor which is configured to provide position information to the portion.

4. The apparatus according to claim 1, wherein the apparatus comprises a mobile device and/or a display which is configured to output information and/or instructions.

5. The apparatus according to claim 1, wherein the apparatus comprises a wireless communications module, which is configured to send a real-time alert in the event of severe segregation problems and/or no segregation problems via a wireless communications link.

6. A paver for distributing paving material comprising an apparatus according to claim 1.

7. A non-transitory digital storage medium having a computer program stored thereon to perform a method for detecting the quality of a paving material distributed along a paving area, the method comprising:
receiving at least one thermal profile of a portion of the paving area in which the paving material is distributed, the thermal profile comprising a plurality of temperature values assigned with respect to measurement points; and
analyzing the at least one thermal profile in order to detect segregated spots of the paving material within the portion, wherein the analysis is performed by determining a first zone of measurement points arranged adjacent to each other and comprising temperature values within a predetermined range, wherein the first zone is at least partially surrounded by measurement points comprising temperature values out of the predetermined range; by analyzing an orientation of the first zone with respect to a travel direction of a paver; and by assigning an indication to the portion based on the analysis of the orientation; wherein analyzing the orientation is performed so as to determine whether the first zone is substantially orientated along or perpendicular to the travel direction; and
wherein said computer program is running on the apparatus of claim 1.

8. A method for detecting the quality of a paving material distributed along a paving area, the method comprising:
receiving at least one thermal profile of a portion of the paving area in which the paving material is distributed, the thermal profile comprising a plurality of temperature values assigned with respect to measurement points; and
analyzing the at least one thermal profile in order to detect segregated spots of the paving material within the portion, wherein the analysis is performed by determining a first zone of measurement points arranged adjacent to each other and comprising temperature values within a predetermined range, wherein the first zone is at least partially surrounded by measurement points comprising temperature values out of the predetermined range; by analyzing an orientation of the first zone with respect to a travel direction of a paver; and by assigning an indication to the portion based on the analysis of the orientation; wherein analyzing the orientation is performed so as to determine whether the first zone is substantially orientated along or perpendicular to the travel direction.

* * * * *